United States Patent
Rath et al.

(10) Patent No.: US 9,715,571 B1
(45) Date of Patent: Jul. 25, 2017

(54) SYSTEMS AND METHODS FOR SIMULATIONS OF RELIABILITY IN PRINTED CIRCUIT BOARDS

(71) Applicant: SAS IP, Inc., Cheyenne, WY (US)

(72) Inventors: Rajiv Lochan Rath, Maharashatra (IN); Vamsi Krishna Yaddanapudi, Maharshtra (IN); Ankit Adhiya, Maharashatra (IN)

(73) Assignee: Ansys, Inc., Canonsburg, PA (US)

( * ) Notice: Subject to any disclaimer, the term of this patent is extended or adjusted under 35 U.S.C. 154(b) by 7 days.

(21) Appl. No.: 14/875,799

(22) Filed: Oct. 6, 2015

Related U.S. Application Data

(60) Provisional application No. 62/061,434, filed on Oct. 8, 2014, provisional application No. 62/218,040, filed on Sep. 14, 2015.

(51) Int. Cl.
G06F 17/50 (2006.01)

(52) U.S. Cl.
CPC ...... *G06F 17/5081* (2013.01); *G06F 17/5009* (2013.01)

(58) Field of Classification Search
CPC ........................ G06F 17/5018; G06F 2217/80
USPC .................................................. 716/136, 137
See application file for complete search history.

(56) References Cited

U.S. PATENT DOCUMENTS

| | | | |
|---|---|---|---|
| 5,202,843 A * | 4/1993 | Kunimine | G01K 3/14 374/E3.009 |
| 5,675,521 A * | 10/1997 | Holzhauer et al. | G06F 17/5018 706/45 |
| 6,579,944 B1 * | 6/2003 | Abdou-Sabet et al. | C08L 101/00 525/191 |
| 7,425,253 B2 * | 9/2008 | Voldman et al. | B03C 5/005 204/547 |
| 7,707,525 B2 * | 4/2010 | Varon-Weinryb | G06F 17/5018 716/136 |
| 7,975,252 B2 * | 7/2011 | Varon-Weinryb | G06F 17/5018 716/100 |
| 2007/0075450 A1 * | 4/2007 | Belegundu et al. | G06F 17/5018 264/40.1 |

OTHER PUBLICATIONS

Hu et al., "Micromechanical Analysis of Copper Trace in Printed Circuit Boards", Feb. 2011, ELSEVIER, 2010 Reliability of Compound Semiconductors (ROCS) Workshop, Microelectronic Reliability, vol. 51, Iss. 2, pp. 416-424.*

(Continued)

*Primary Examiner* — Sun Lin
(74) *Attorney, Agent, or Firm* — Jones Day

(57) ABSTRACT

Systems and methods are provided for simulations of printed circuit boards (PCBs). Geometry data related to a PCB is determined from layout data associated with the PCB. A finite element mesh is generated based at least in part on the geometry data related to the PCB, the finite element mesh including one or more mesh components. One or more conductors passing through the one or more mesh components are identified. A volume fraction of the one or more conductors within the one or more mesh components is computed. One or more physical properties of the one or more mesh components are adjusted based at least in part on the volume fraction.

23 Claims, 11 Drawing Sheets

(56) References Cited

OTHER PUBLICATIONS

Berger et al., "Numerical Approaches for Calculating the Effective Thermo-Mechanical Properties of Three-Phase Composites", Jun. 2007, National Taiwan University of Science and Technology, Proceedings of the Seventh International Congress on Thermal Stresses, pp. 631-634.*

Hu et al., "Thermoelastic Properties of Printed Circuit Boards: Effect of Copper Trace", Jun. 2009, IEEE, European, Microelectronic and Packaging Conference (EMPC 2009), Technical Digest, 6 pages.*

* cited by examiner

SYSTEMS AND METHODS FOR SIMULATIONS OF RELIABILITY IN PRINTED CIRCUIT BOARDS

CROSS REFERENCE TO RELATED APPLICATIONS

This application claims priority to U.S. Patent Application No. 62/061,434, filed Oct. 8, 2014, and U.S. Patent Application No. 62/218,040, filed Sep. 14, 2015, the entirety of which is herein incorporated by reference.

TECHNICAL FIELD

The present disclosure relates generally to electronic circuits and, more specifically, to printed circuit boards.

BACKGROUND

Ensuring mechanical reliability is one of the key concerns for printed circuit board (PCB) design. Accurate reliability analysis requires the ability to predict the warpage (displacement) of PCBs under thermo-mechanical loads. PCBs are very complex, consisting of multiple layers of dielectric material and metal conductors. For example, a PCB may include strips of metal (also called traces) and Fr4 materials (e.g., composite materials composed of woven fiberglass cloth with an epoxy resin binder). There may be hundreds of conductors and these may have very complicated shapes. The conductors may be polygons with hundreds of vertices. In addition, these polygons may overlap, may contain polygonal holes and may have a very high aspect ratio.

Conventional methods based on Finite Element Analysis (FEA) rely on accurate modeling of the board and conductor geometry to predict displacement. However, due to the complexity of the geometry, the FEA approach becomes computationally prohibitive.

SUMMARY

In accordance with certain embodiments, systems and methods are provided for simulations of printed circuit boards (PCBs). Geometry data related to a PCB is determined from layout data associated with the PCB. A finite element mesh is generated based at least in part on the geometry data related to the PCB, the finite element mesh including one or more mesh components. One or more conductors passing through the one or more mesh components are identified. A volume fraction of the one or more conductors within the one or more mesh components is computed. One or more physical properties of the one or more mesh components are adjusted based at least in part on the volume fraction.

As an example, a processor-implemented system for simulations of printed circuit boards (PCBs) includes: one or more data processors and one or more non-transitory computer-readable storage media encoded with instructions for commanding the one or more data processors to execute certain operations. Geometry data related to a PCB is determined from layout data associated with the PCB. A finite element mesh is generated based at least in part on the geometry data related to the PCB, the finite element mesh including one or more mesh components. One or more conductors passing through the one or more mesh components are identified. A volume fraction of the one or more conductors within the one or more mesh components is computed. One or more physical properties of the one or more mesh components are adjusted based at least in part on the volume fraction.

As another example, a non-transitory machine-readable storage medium is encoded with instructions for commanding one or more data processors to execute operations of a method for simulations of printed circuit boards (PCBs). Geometry data related to a PCB is determined from layout data associated with the PCB. A finite element mesh is generated based at least in part on the geometry data related to the PCB, the finite element mesh including one or more mesh components. One or more conductors passing through the one or more mesh components are identified. A volume fraction of the one or more conductors within the one or more mesh components is computed. One or more physical properties of the one or more mesh components are adjusted based at least in part on the volume fraction.

DETAILED DESCRIPTION

Figure 1:
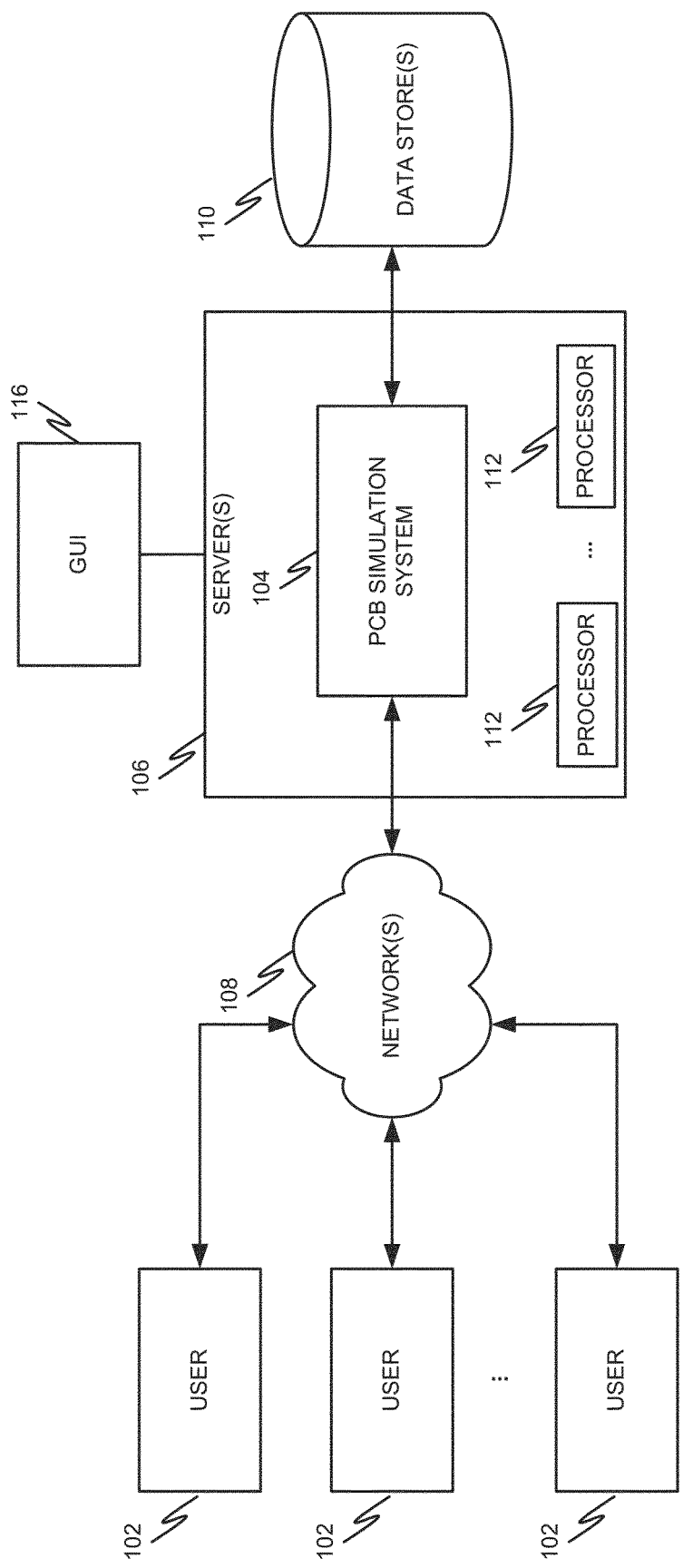
FIG. 1 depicts an example computer-implemented environment wherein users can interact with a PCB simulations system hosted on one or more servers through a network.

FIG. 1 depicts an example computer-implemented environment wherein users 102 can interact with a printed-circuit-board (PCB) simulation system 104 hosted on one or more servers 106 through a network 108. The PCB simulation system 104 can assist the users 102 for accurate reliability analysis of PCBs. Specifically, the PCB simulation system 104 implements a conductor (e.g., metal) fraction algorithm to simplify a finite element analysis (FEA) model and provide accurate displacement calculations. In some embodiments, the PCB simulation system 104 constructs a finite element mesh for a PCB and interpolates trace data onto the mesh for reliability simulations of the PCB. In certain embodiments, the PCB simulation system 104 can compute and/or adjust physical properties (e.g., thermal properties, structural properties, mechanical properties, etc.) of each mesh component based on the conductor (e.g., metal) fraction. In specific embodiments, the PCB simulation system 104 takes into account trace variation and is suitable for reliability analysis (e.g., warpage, delamination, etc.).

As shown in FIG. 1, the users 102 can interact with the PCB simulation system 104 through a number of ways, such as over one or more networks 108. The PCB simulation system 104 may assists one or more of the users 102 to perform reliability analysis of PCBs through a graphical user interface 116. One or more servers 106 accessible through the networks 108 can host the PCB simulation system 104. The one or more servers 106 implement one or more data processors 112. For example, the data processors 112 can be configured for parallel computing.

Figure 2:
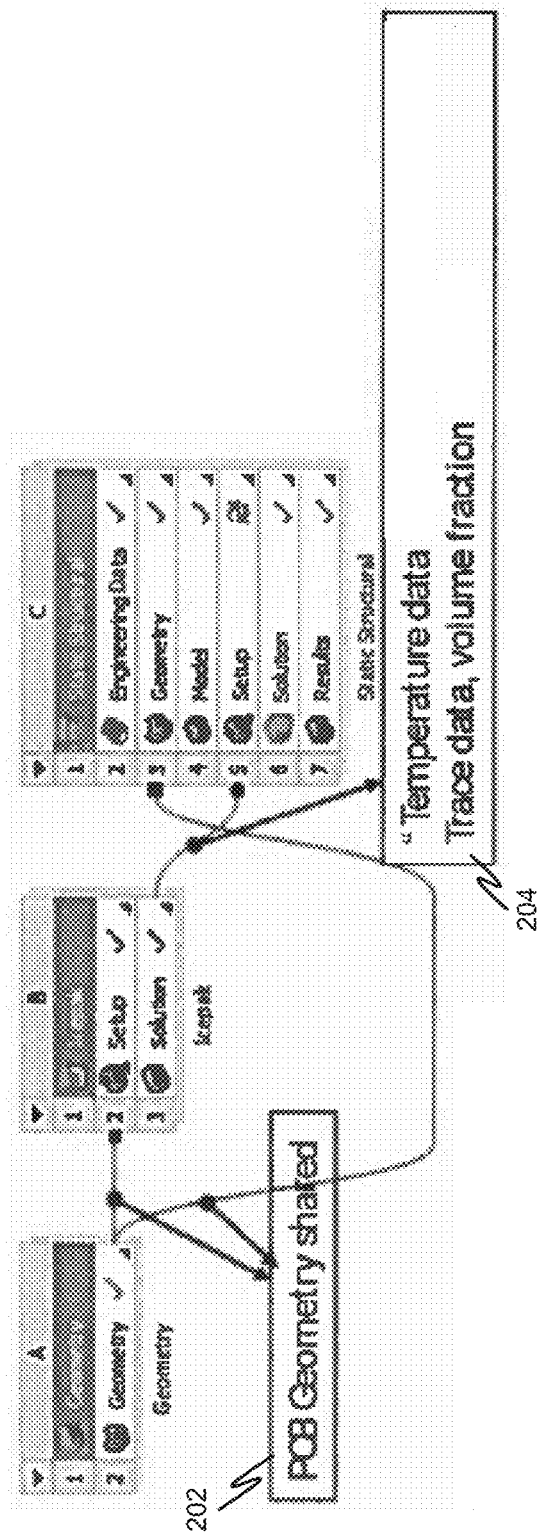
FIG. 2 depicts an example diagram showing certain input data.

The one or more servers 106 can also contain or have access to one or more data stores 110 for storing input data and/or output data for the PCB simulation system 104. For example, as shown in FIG. 2, it is shown on the GUI 116 that geometry data of PCBs 202 is imported/supplied as input data for the PCB simulation system 104 to perform reliability simulations. Other input data 204 may also be imported/supplied to the PCB simulation system 104, such as temperature data, trace data, volume fraction of conductors (e.g., metal), etc.

Figure 3:
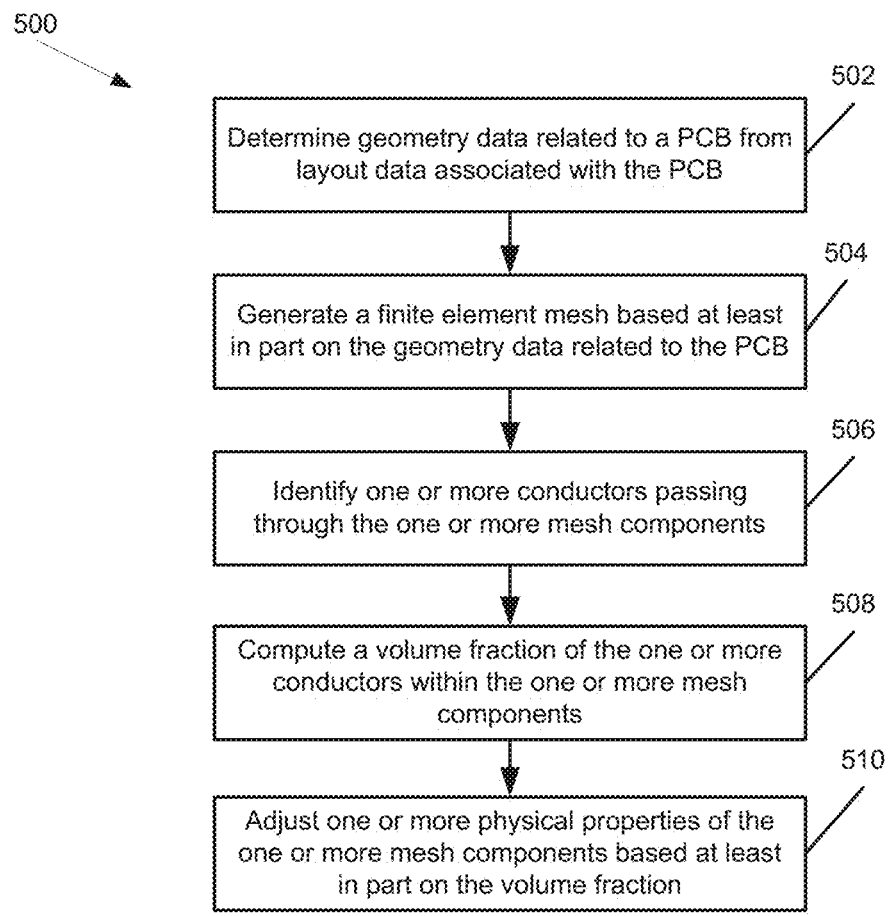
FIG. 3 depicts an example flow chart for PCB simulations.

FIG. 3 depicts an example flow chart for PCB simulations. As shown in FIG. 3, at 502, geometry data related to a PCB is determined from layout data associated with the PCB. For example, the geometry of the PCB, including but not limited to, the board outline and any holes, and the conductor (e.g., metal) geometry are read in from electronic computer-aided design (CAD) layout data of the PCB. At 504, a finite element mesh is generated based at least in part on the geometry data related to the PCB. The finite element mesh includes one or more mesh components (elements). For example, the PCB geometry is discretized into the finite element mesh, and the mesh components can be of any polygonal shapes, such as triangular shapes, rectangular shapes, etc.

At 506, one or more conductors passing through the one or more mesh components are identified. For example, a fast octree search method is used to identify the conductors passing through a mesh component. An octree is a tree data structure in which each internal node has exactly eight children. Octrees are most often used to partition a three dimensional space by recursively subdividing it into eight octants. Octrees are the three-dimensional analog of quadtrees. At 508, a volume fraction of the one or more conductors within the one or more mesh components is computed. For example, the volume fraction of the conductors within a mesh component is computed for each of three orthogonal directions (e.g., X, Y and Z).

At 510, one or more physical properties (e.g., thermal properties, structural properties, mechanical properties, etc.) of the one or more mesh components are adjusted based at least in part on the volume fraction. For example, the base dielectric mechanical properties of each mesh component are adjusted based on the volume fraction of the conductor material, which results in an anisotropic material characterization of the dielectric in three orthogonal directions, adjusted by the anisotropic conductor (e.g., metal) volume fraction. The overall stiffness of the PCB can be preserved thus allowing for an accurate FEA computation to obtain board displacement. In some embodiments, the PCB simulation system 104 maps physical properties to the mesh and captures local variations of physical properties without physical modeling of traces.

Figure 4:
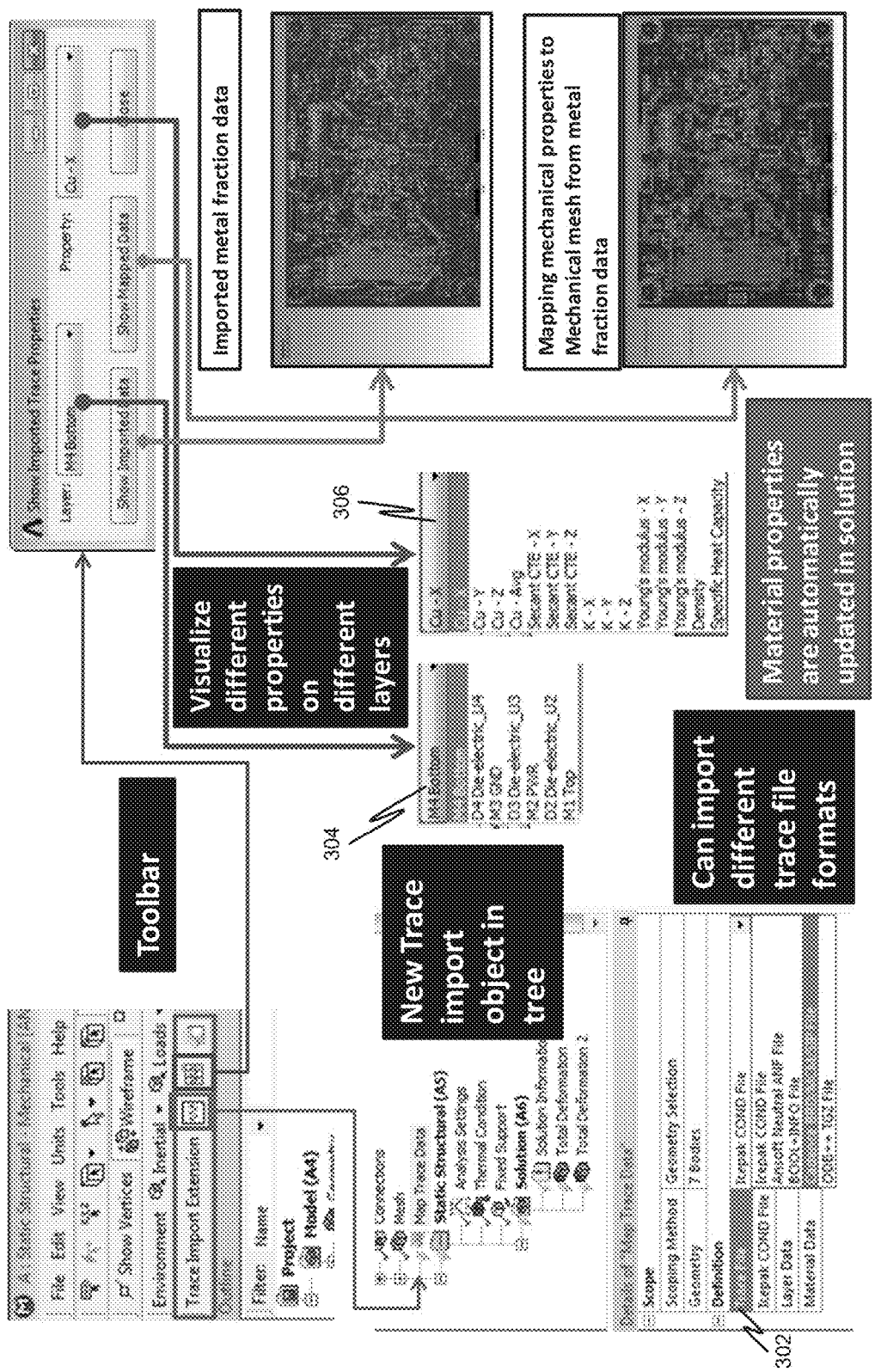
FIG. 4 depicts an example diagram showing a user interface for trace mapping.

FIG. 4 depicts an example diagram showing a user interface for trace mapping. As shown in FIG. 4, trace data can be imported to the PCB simulation system 104. For example, the PCB simulation system 104 can read different trace file formats 302 and generate an ASCII file with conductor (e.g., copper) fractions distribution information of a PCB. Then, the PCB simulation system 104 generates a mesh based on the conductor fractions distribution information and maps physical properties (e.g., mechanical properties, structural properties, thermal properties, etc.) of the PCB to the mesh for reliability simulations. For example, the PCB simulation system 104 updates (e.g., automatically) the physical properties. In some embodiments, the PCB simulation system 104 displays on the GUI 116 different properties of different layers of the PCB (e.g., 304 and 306) for the users 102 to inspect.

Figure 5A:
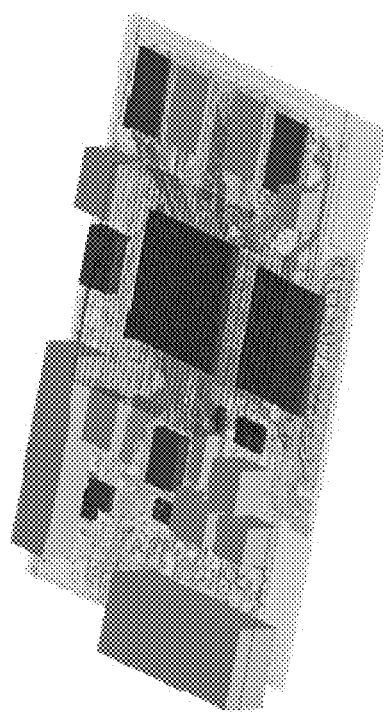
FIG. 5(A) and FIG. 5(B) depict example diagrams showing trace mapping.
Figure 5B:
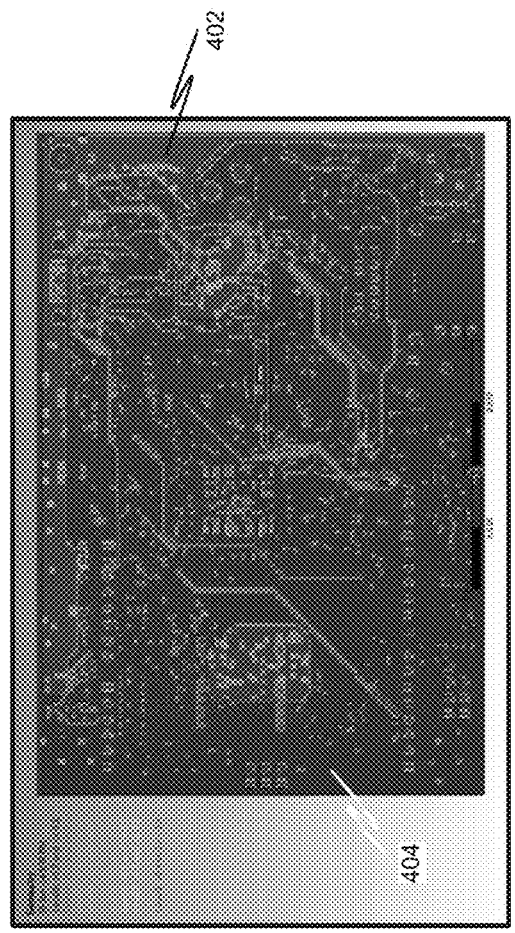

FIG. 5(A) and FIG. 5(B) depict example diagrams showing trace mapping. As shown in FIG. 5(A) and FIG. 5(B), conductor (e.g., copper) fraction data of a PCB is imported for generating a finite element mesh, and physical properties are mapped to the mesh. For example, copper traces 402 and FR4 materials 404 are shown in FIG. 5(B), and interpolation between copper and FR4 may be present. Each mesh component may include some percentage of copper and some percentage of FR4.

Figure 6:
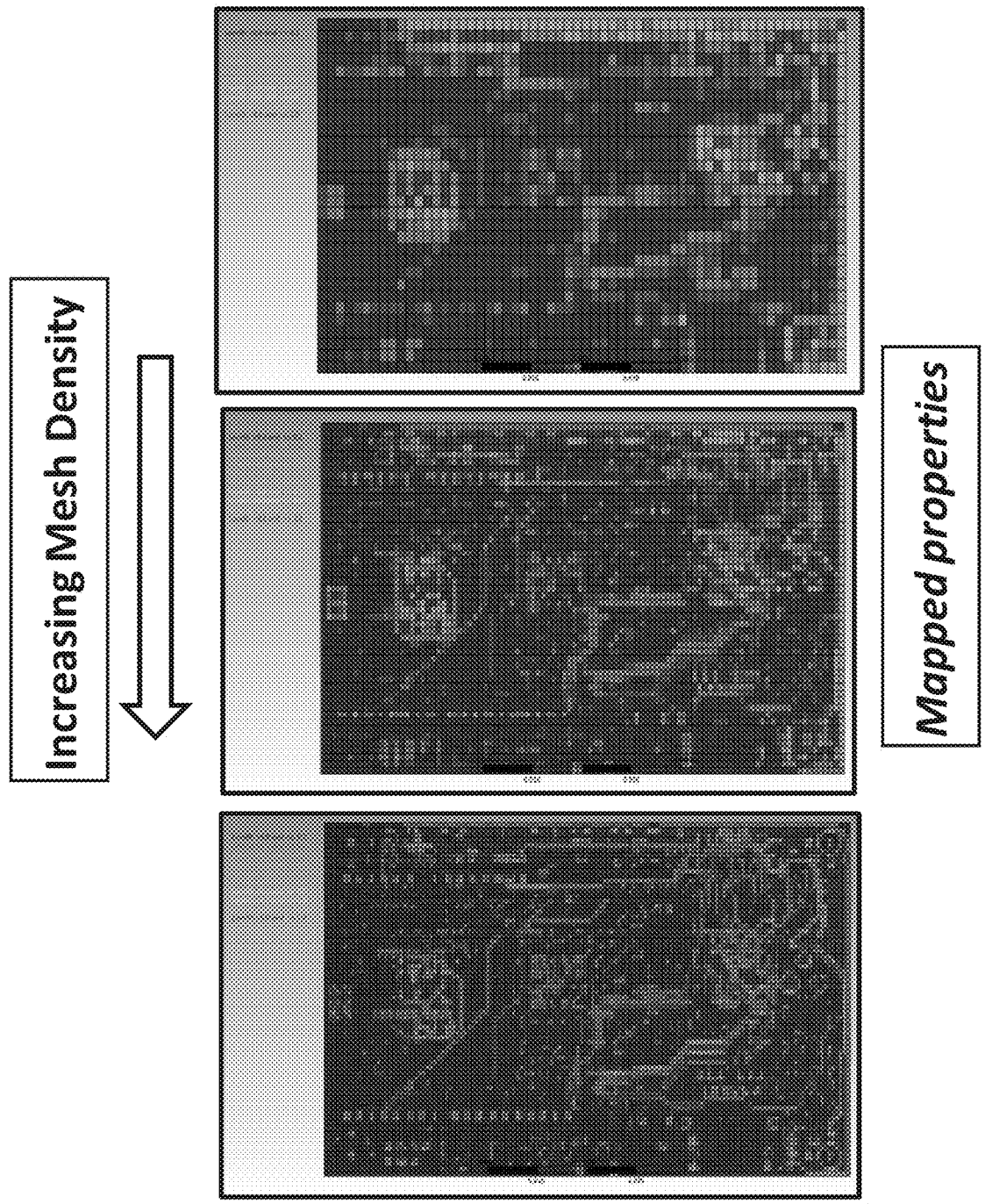
FIG. 6 depicts an example diagram for trace mapping with different mesh densities.

As shown in FIG. 6, the features of the mapped physical properties are captured more accurately if the mesh density is increased. In some embodiments, the PCB simulation system 104 can adjust the mesh density to optimize between accuracy required and computational time. In certain embodiments, the PCB simulation system 104 can obtain user inputs from the GUI 116 to determine the mesh density for mapping the physical properties.

The PCB simulation system 104 can model PCBs in various ways for reliability simulations with practical and accurate displacement calculations without requiring a finite element mesh that captures all of the geometric details of conductors in the PCBs. Depending on different speed and accuracy requirements, the PCB simulation system 104 can select a particular model for PCBs.

In some embodiments, the PCB simulation system 104 can model each layer of a PCB with a single element through the layer thickness direction. Volume fractions are computed on a layer-by-layer basis. For example, for an 8-layer PCB, if a 200 by 200 uniform grid across the PCB length/width is determined, the mesh includes 320,000 mesh components. Then, the PCB simulation system 104 can perform board level simulations based on the determined mesh model.

In certain embodiments, the PCB simulation system 104 can use a layered solid element which can model all the layers of a PCB with a single element through the board thickness. The volume fractions are computed across all the layers within the layered solid element. For example, for an 8-layer PCB, if a 200 by 200 uniform grid across the PCB length/width is determined, the mesh includes 40,000 mesh components.

Figure 7:
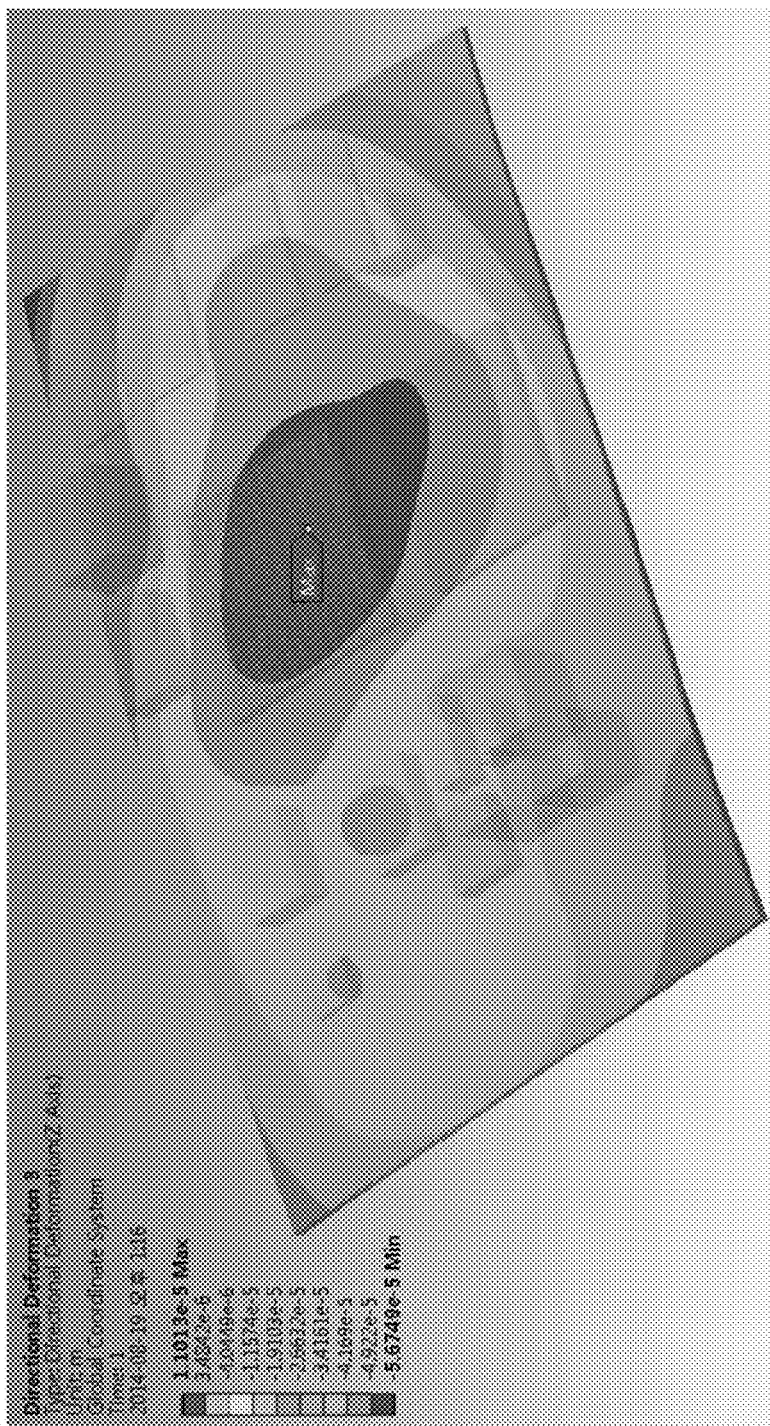
FIG. 7 depicts an example diagram showing deformation of a PCB based on trace mapped simulations.
Figure 8:
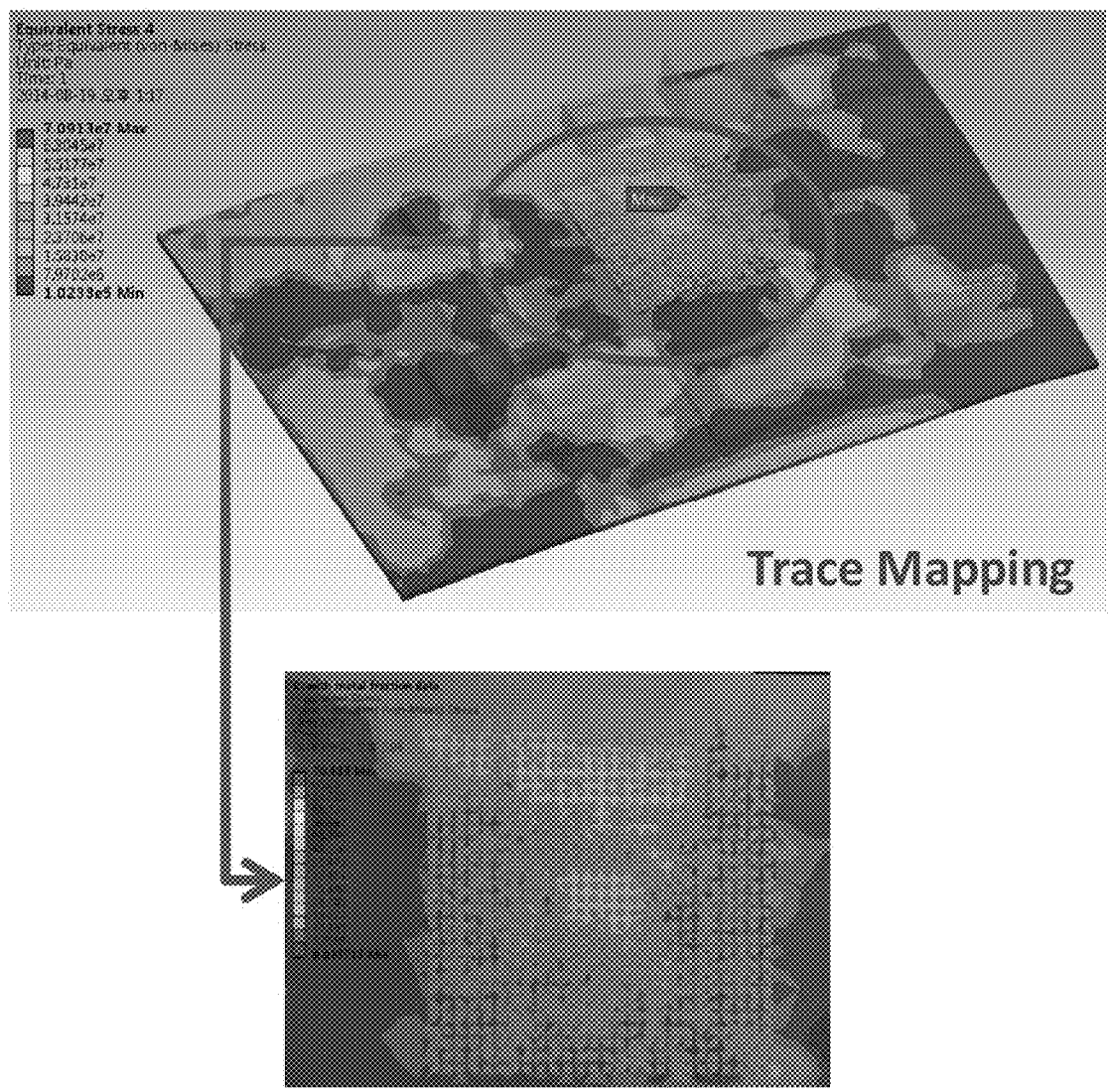
FIG. 8 depicts an example diagram showing thermal stress analysis results based on trace mapped simulations.

Once the PCB simulation system 104 generates a finite element mesh for simulations, the PCB simulation system 104 can perform a thermal analysis on the PCB to obtain temperature data and interpolate the temperature data onto the finite element mesh for a thermo-mechanical analysis. The physical properties of each mesh component are adjusted based on the temperature data in the mesh component. The PCB simulation system 104 can then perform simulations to compute deflection of the PCB. FIG. 7 depicts an example diagram showing deformation of a PCB based on trace mapped simulations. Particularly, the overall equivalent stress distribution and stresses at different points of the PCB are shown. FIG. 8 depicts an example diagram showing thermal stress analysis results based on trace mapped simulations.

Figure 9:
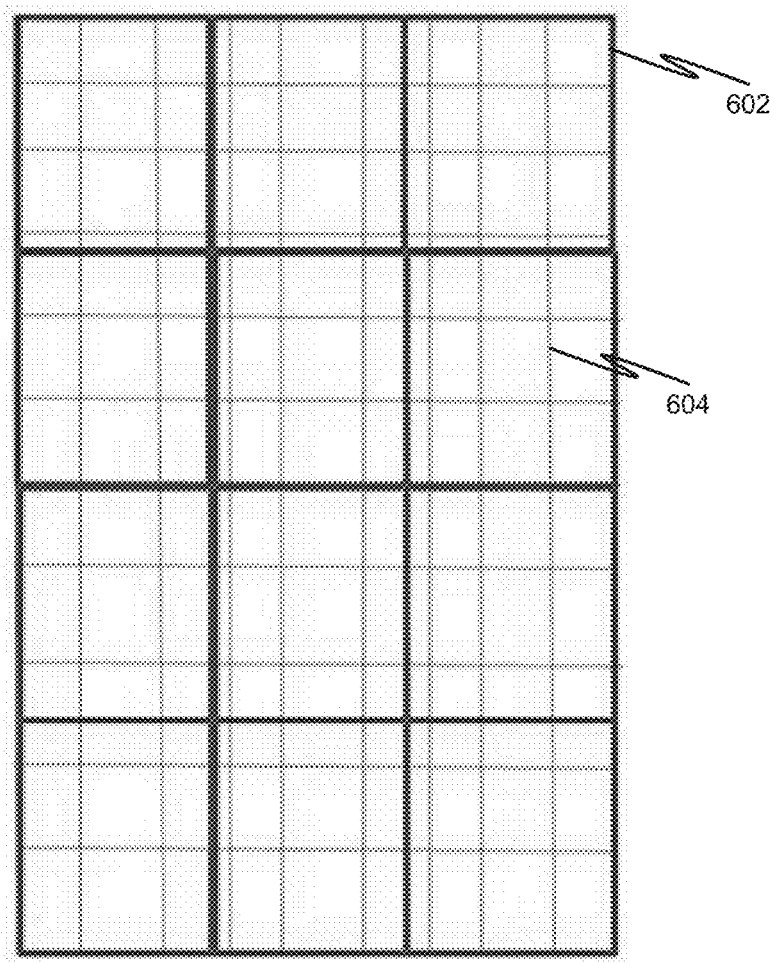
FIG. 9 depicts an example diagram showing computation of physical properties.

FIG. 9 depicts an example diagram showing computation of physical properties. As shown in FIG. 9, the finite element mesh includes multiple mesh components (e.g., 602). Data related to conductor (e.g., copper) fractions distribution (e.g., 604) is obtained from an ASCII file generated based on trace data. The conductor fraction inside a mesh component is determined to be a volume average of the conductor fractions from the ASCII file. The average conductor fractions along three orthogonal directions (e.g., X, Y and Z) are then used to compute anisotropic material properties for the mesh component.

For example, a thermal conductivity for pure copper along the X direction is 387.6 W/m·K, and a thermal conductivity for pure Fr4 material along the X direction is 0.35 W/m·K. An average copper fraction along the X direction in a mesh component is determined to be 0.3, and then the thermal conductivity of the mesh component along the X direction is determined to be 116.5 W/m·K. Temperature dependent physical properties other than thermal conductivity can be determined similarly.

In certain embodiments, the conductor fraction along the X direction may be different from the fraction along the Y direction and/or the fraction along the Z direction depending on the trace path. The X/Y/Z components of the physical properties (e.g., thermal conductivity) can be combined using a weighted average. As an example, for polygonal mesh component, a bounded box can be used for grid cut, and parts outside the polygon have zero conductor fractions (e.g., X and Y).

Figure 10:
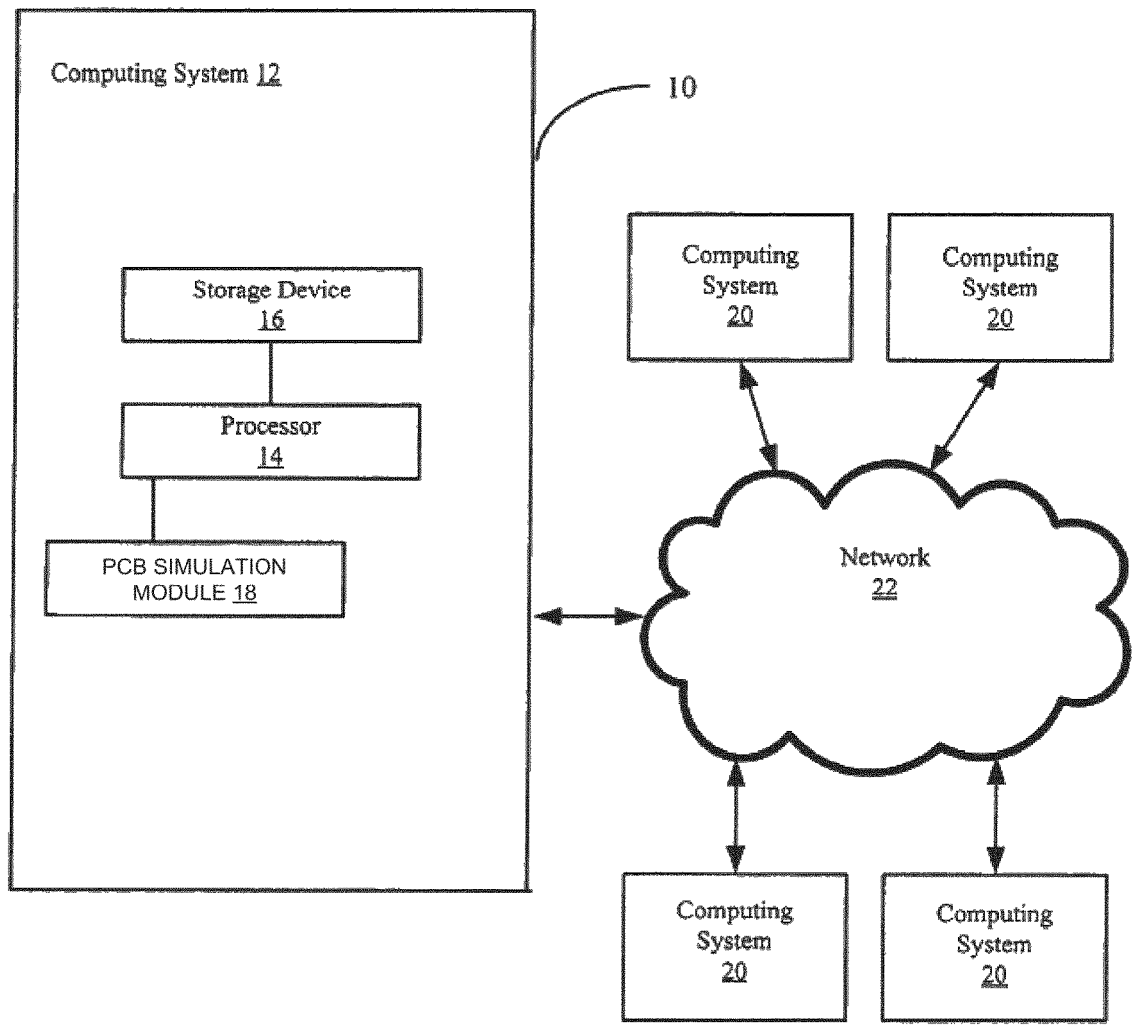
FIG. 10 depicts an example diagram showing a system for PCB simulations.

FIG. 10 depicts an example diagram showing a system for PCB simulations. As shown in FIG. 10, the system 10 includes a computing system 12 which contains a processor 14, a storage device 16 and a PCB simulation module 18. The computing system 12 includes any suitable type of computing device (e.g., a server, a desktop, a laptop, a tablet, a mobile phone, etc.) that includes the processor 14 or provide access to a processor via a network or as part of a cloud based application. The PCB simulation module 18 includes tasks (e.g., as shown in FIG. 3) and is implemented as part of a user interface module (not shown in FIG. 10).

Figure 11:
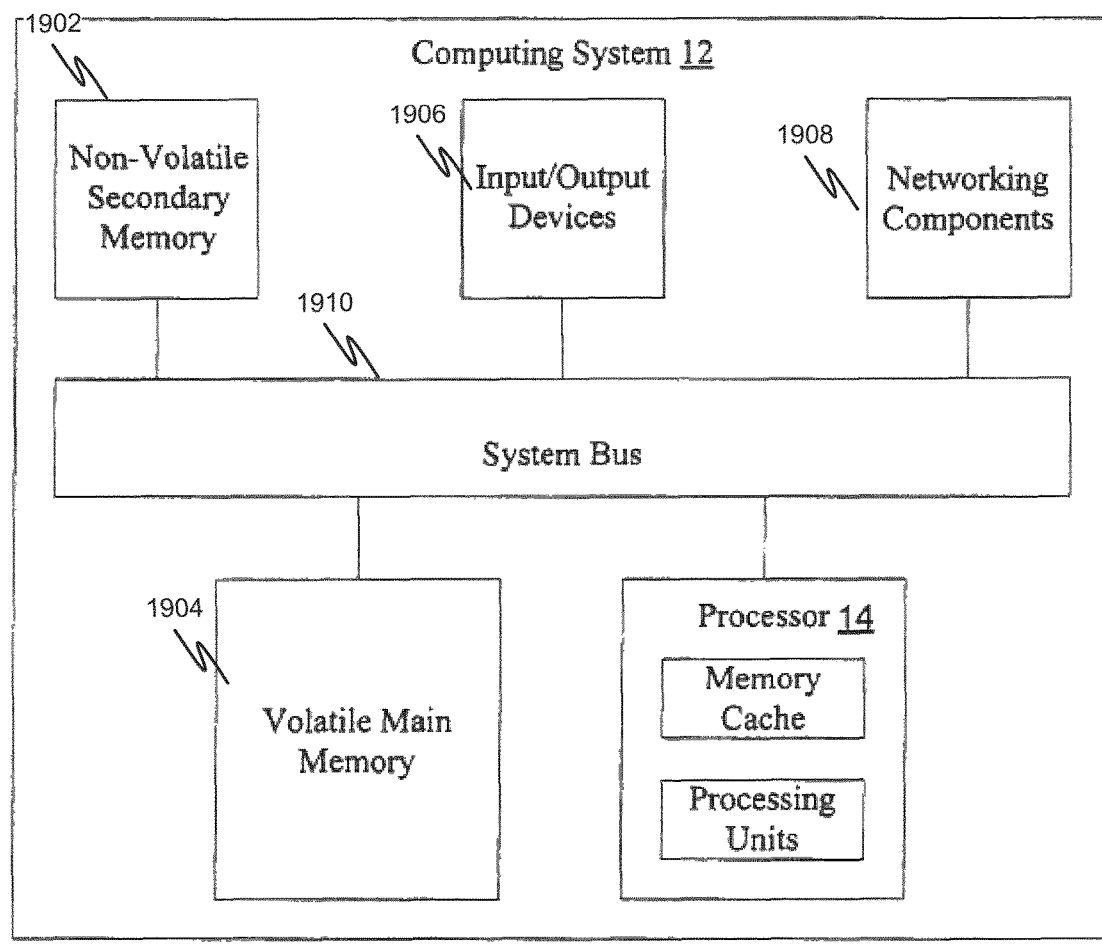
FIG. 11 depicts an example diagram showing a computing system for PCB simulations.

FIG. 11 depicts an example diagram showing a computing system for PCB simulations. As shown in FIG. 11, the computing system 12 includes a processor 14, memory devices 1902 and 1904, one or more input/output devices 1906, one or more networking components 1908, and a system bus 1910. In some embodiments, the computing system 12 includes the PCB simulation module 18, and provides access to the PCB simulation module 18 to a user as a stand-alone computer.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The invention claimed is:

1. A computer-implemented method for simulations of printed circuit boards (PCBs), the method comprising:
   determining, using one or more data processors, geometry data related to a PCB from layout data associated with the PCB, the layout data being stored in one or more non-transitory computer readable storage media;
   generating, using the one or more data processors, a finite element mesh based at least in part on the geometry data related to the PCB, the finite element mesh including a plurality of mesh components;
   identifying, using the one or more data processors, one or more conductors passing through a first mesh component of the plurality of mesh components;
   computing, using the one or more data processors, a conductor fraction associated with portions of the one or more conductors contained within the first mesh component; and
   adjusting, using the one or more data processors, a physical property of the first mesh component based at least in part on the conductor fraction.

2. The method of claim 1, wherein the geometry data includes geometry of the PCB and geometry of the one or more conductors.

3. The method of claim 1, wherein the generating a finite element mesh based at least in part on the geometry data related to the PCB includes:
   discretizing the geometry data.

4. The method of claim 1, wherein the one or more mesh components have polygonal shapes.

5. The method of claim 1, wherein the one or more conductors are identified using a fast octree search algorithm.

6. The method of claim 1, wherein the conductor fraction of the first mesh component includes distinct X, Y, and Z components each associated with one of three orthogonal directions.

7. The method of claim 6, wherein adjusting the physical property includes adjusting three distinct X, Y, and Z components of the physical property.

8. The method of claim 1, wherein the PCB includes one or more layers each layer comprising of dielectric material and conductors.

9. The method of claim 8, wherein the generating a finite element mesh based at least in part on the geometry data related to the PCB includes:
generating distinct mesh components for each layer of the PCB each having a thickness property for a given temperature equivalent to a respective PCB layer thickness for the given temperature, wherein the thickness is measured along a line perpendicular to each layer of the PCB.

10. The method of claim 8, wherein the generating a finite element mesh based at least in part on the geometry data related to the PCB includes:
generating mesh components to encompass a portion of multiple layers and having a thickness property for a given temperature equivalent to an aggregated thickness of the multiple layers for a given temperature, wherein the thickness is measured along a line perpendicular to each layer of the PCB.

11. The method of claim 1, further comprising:
performing a thermal analysis on the PCB to determine temperature-related data;
interpolating the temperature-related data onto the finite element mesh; and
adjusting the one or more physical properties of the one or more mesh components based at least in part on the temperature-related data.

12. The method of claim 1, further comprising:
performing deflection calculation through simulations.

13. The method of claim 1, wherein the physical properties include thermal properties and structural properties.

14. The method of claim 1 further comprising:
identifying, using the one or more data processors, second one or more conductors passing through a second mesh component of the plurality of mesh components;
computing, using the one or more data processors, a second conductor fraction associated with the second one or more conductors as of the second mesh component; and
adjusting, using the one or more data processors, the physical property of the second mesh component based at least in part on the second conductor fraction, wherein the second conductor fraction is different than the first conductor fraction and the physical property of the first mesh component is different than the physical property of the second mesh component.

15. The method of claim 1 wherein adjusting the physical property results in the physical property having orthotropic values that differ in each of three mutually orthogonal directions.

16. A processor-implemented system for simulations of printed circuit boards (PCBs), the system comprising:
one or more data processors; and
one or more non-transitory computer-readable storage media encoded with instructions for commanding the one or more data processors to execute operations including:
determine geometry data related to a PCB from layout data associated with the PCB;
generate a finite element mesh based at least in part on the geometry data related to the PCB, the finite element mesh including a plurality of mesh components;
identify one or more conductors passing through a first mesh component of the plurality of mesh components;
compute a conductor fraction associated with portions of the one or more conductors contained within the first mesh component; and
adjust one or more physical properties of the first mesh component based at least in part on the conductor fraction.

17. The system of claim 16, wherein the geometry data includes geometry of the PCB and geometry of the one or more conductors.

18. The system of claim 16, wherein the one or more conductors are identified using a fast octree search algorithm.

19. The system of claim 16, wherein the conductor fraction of the first mesh component for includes distinct X, Y, and Z components each of associated with one of three orthogonal directions.

20. The system of claim 16, wherein the instructions are adapted for commanding the one or more data processors to execute further operations including:
determine a number of layers of the PCB; and
determine a uniform grid for each layer of the PCB.

21. The system of claim 16, wherein the instructions are adapted for commanding the one or more data processors to execute further operations including:
determine a layered grid for the PCB.

22. The system of claim 16, wherein the instructions are adapted for commanding the one or more data processors to execute further operations including:
performing a thermal analysis on the PCB to determine temperature-related data;
interpolating the temperature-related data onto the finite element mesh; and
adjusting the one or more physical properties of the one or more mesh components based at least in part on the temperature-related data.

23. A non-transitory machine-readable storage medium encoded with instructions for
commanding one or more data processors to execute operations of a method for simulations of printed circuit boards (PCBs), the method comprising:
determining geometry data related to a PCB from layout data associated with the PCB;
generating a finite element mesh based at least in part on the geometry data related to the PCB, the finite element mesh including a plurality of mesh components;
identifying one or more conductors passing through a first mesh component of the plurality of mesh components;
computing a conductor fraction associated with portions of the one or more conductors contained within the first mesh component; and adjusting one or more physical properties of the first mesh component based at least in part on the conductor fraction.

\* \* \* \* \*